W. B. MURRAY.
TRAIN CONTROL CIRCUIT.
APPLICATION FILED JULY 27, 1912.
1,180,789.
Patented Apr. 25, 1916.
4 SHEETS—SHEET 2.
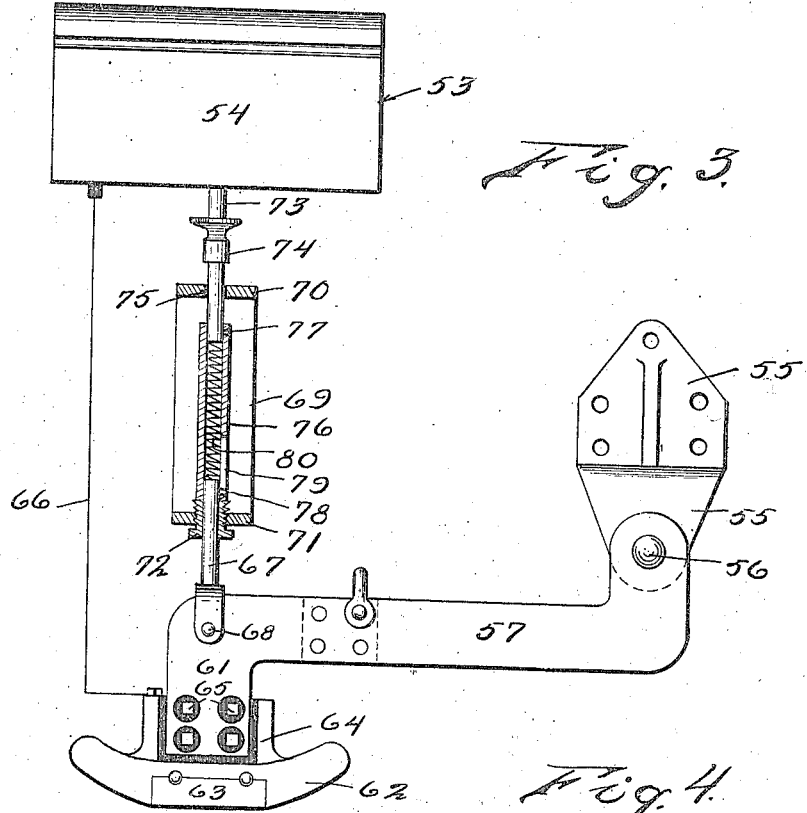
Fig. 3.
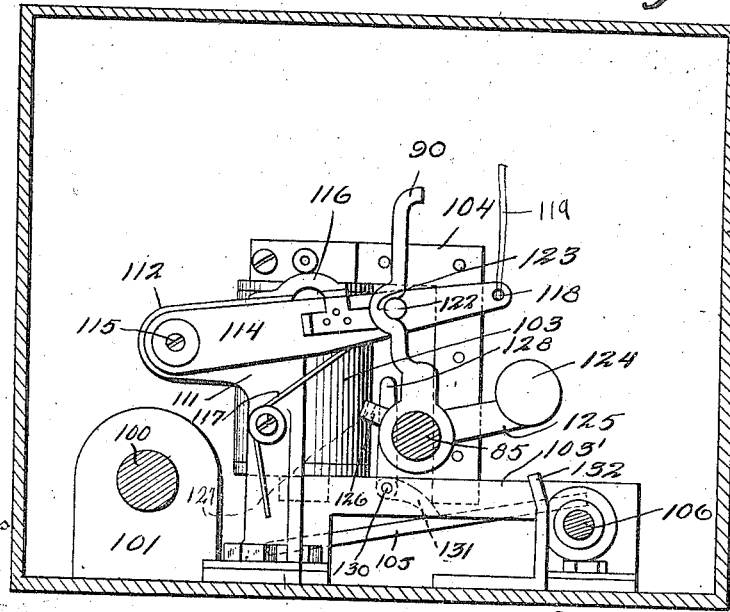
Fig. 4.
Witnesses
Inventor
W. B. Murray
Attorney

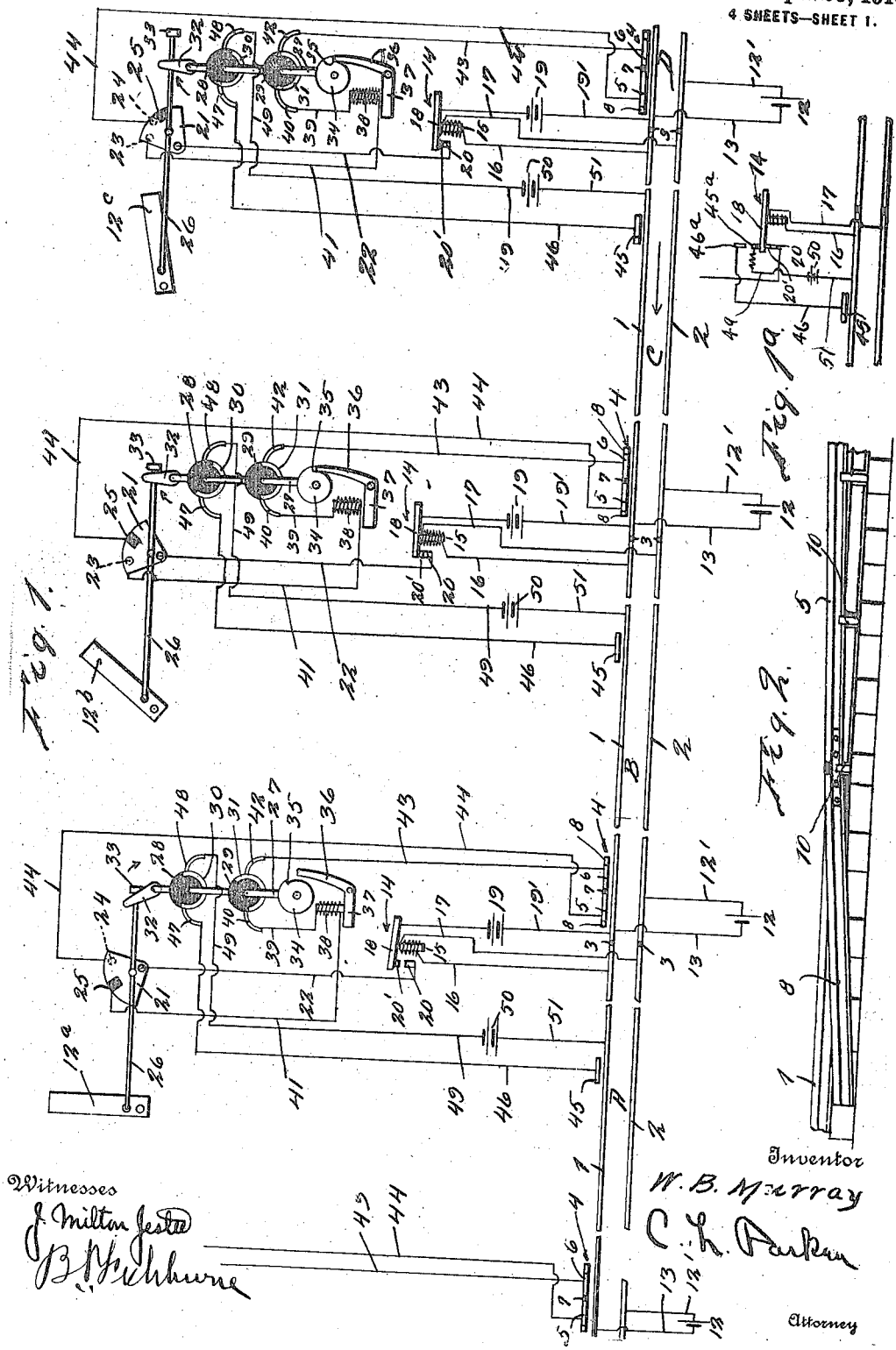

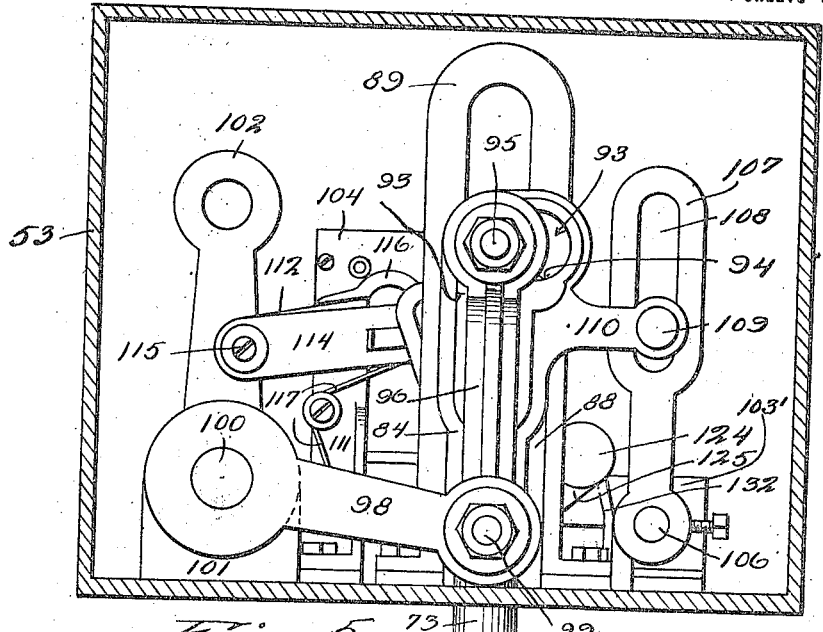
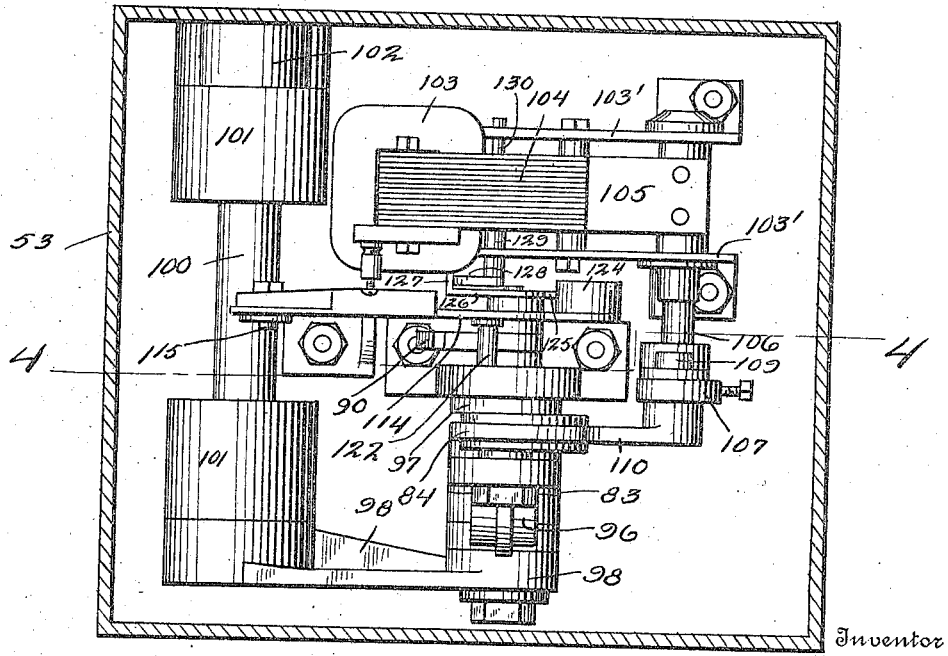

UNITED STATES PATENT OFFICE.

WILLIAM B. MURRAY, OF WASHINGTON, DISTRICT OF COLUMBIA, ASSIGNOR TO THE MILLER TRAIN CONTROL CORPORATION, OF STAUNTON, VIRGINIA, A CORPORATION OF VIRGINIA.

TRAIN-CONTROL CIRCUIT.

1,180,789.

Specification of Letters Patent.

Patented Apr. 25, 1916.

Original application filed July 27, 1912, Serial No. 711,792. Divided and this application filed July 27, 1912. Serial No. 711,793.

*To all whom it may concern:*

Be it known that I, WILLIAM B. MURRAY, a citizen of the United States, residing at Washington, in the District of Columbia, have invented certain new and useful Improvements in Train-Control Circuits, of which the following is a specification.

The present invention relates to a novel circuit for use in connection with a train control means, shown and described in my co-pending application Serial No. 711,792, filed July 27, 1912, of which this application is a division.

An important object of this invention is to provide means of the above mentioned character, which will connect and disconnect ramps with sources of current, such ramps being disposed near the entrance ends of the blocks to coöperate with apparatus carried by the engine.

A further object of the invention is to provide means for disconnecting a ramp from a source of current, which ramp is disposed inwardly of and near the entrance end of the block in case the signal should not be properly set to protect the rear of the engine which has already entered such block.

A further object of this invention is to provide novel means to disconnect the ramp section from the source of current when the same is engaged by the shoe included in the apparatus carried by the engine.

Other objects and advantages of the invention will be apparent during the course of the following description.

Figure 7:
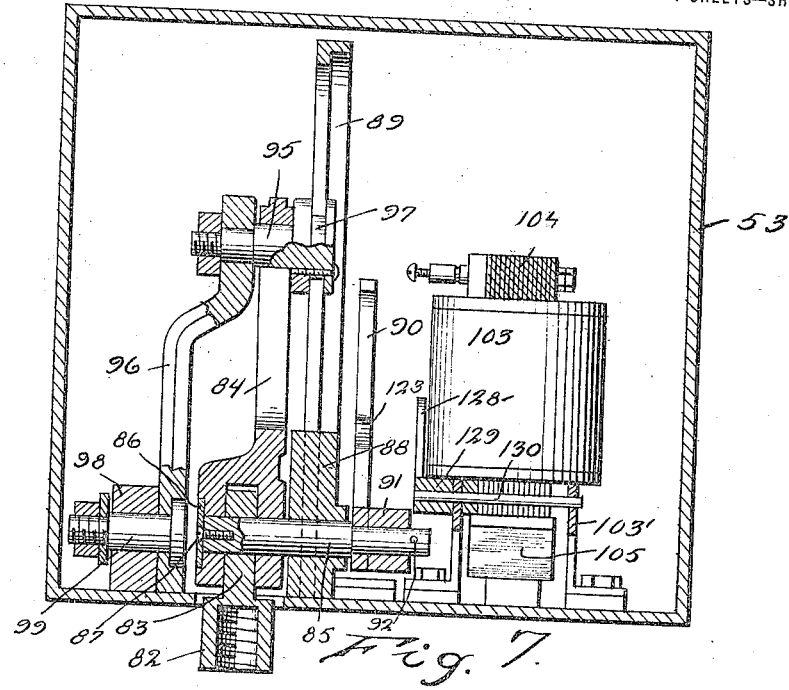
Figure 8:
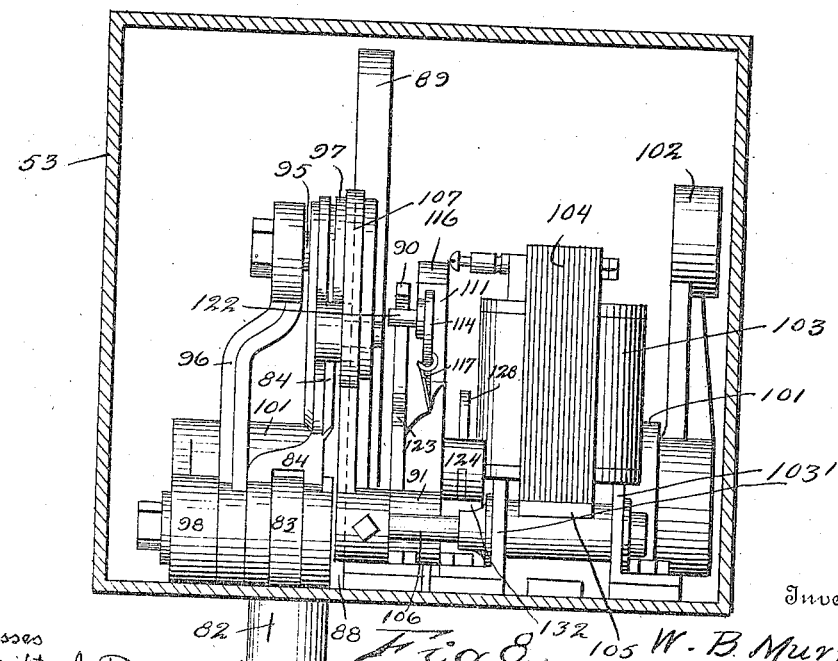

In the accompanying drawings forming a part of this specification, and in which like numerals are employed to designate like parts throughout the same, Figure 1 is a diagrammatic view of a track, circuits, and associated elements included in the system, Fig. 1ª is a diagrammatic view of a modified form of means to connect the auxiliary ramp with the source of current, Fig. 2 is an enlarged fragmentary view of one of the ramp sections, Fig. 3 is a side elevation of the apparatus carried by the engine, the same being removed therefrom. Fig. 4 is a sectional view taken on line 4—4 of Fig. 6, Fig. 5 is a side elevation of the mechanically operated and electrically controlled apparatus, Fig. 6 is a plan view of the same, Fig. 7 is a transverse sectional view taken through the vertically movable carriage and associated elements, and, Fig. 8 is an end view of the apparatus.

In the drawings wherein, for the purpose of illustration, I have shown a preferred embodiment of my invention, attention being called more particularly to Fig. 1, the numerals 1 and 2 designate track rails, insulated at spaced intervals, as shown at 3, to provide blocks A, B, C and D of suitable lengths. As indicated by the arrow, the traffic is in one direction, from right to the left. Disposed outwardly of the track rail 1 and suitably near the entrance end of each block, is a ramp 4, which is inclined longitudinally in a vertical plane and comprises ramp sections 5 and 6, insulated from each other, as shown at 7. At their outer ends, the ramp sections are connected with and insulated from extensions 8, included in the ramp. These extensions extend below the track rail 1 and engage the railroad bed. The extensions 8 never have connection with any source of current and serve to slightly mechanically operate the apparatus before it is operated by the ramp sections, but this operation is not sufficient to actuate the train stopping means, as will be apparent hereinafter. The ramp sections 5 and 6 and extensions 8 are formed of ordinary track rails, held in place by chairs 10 or the like. The chairs 10 suitably increase in height toward the inner ends of the ramp sections 5 and 6, to properly hold such ramp sections in their vertically inclined positions.

At the right or entrance ends of the blocks A, B and C are disposed semaphores comprising vertically swinging paddles $12^a$, $12^b$, and $12^c$, respectively. It is to be understood that like semaphores are placed at the entrance end of the remaining blocks. The semaphore paddles are adapted to assume three positions, a horizontal to indicate danger, as shown by the paddle $12^a$, an intermediate position to indicate caution, as shown by the paddle 12$^b$, and a lowermost position to indicate a clear block, as shown by the paddle 12$^c$. These semaphore paddles may be either manually moved or operated by any ordinary electrically controlled system or systems. The ramp sections 5 and 6 being disposed suitably near the entrance ends of the block, control the passage of the engine or train from one block to the right into the next block to the left.

At the exit end of each block is disposed a source of current 12 connected by the wire 12′ with the rail 2 and connected with the rail 1 by a wire 13. Disposed at the entrance end of each block is a relay 14, comprising an electro-magnet 15, having its winding connected with the rails 1 and 2 by wires 16 and 17, as shown. Disposed near the electro-magnet is an armature 18, which is held adjacent such electro-magnet when the same is energized but will automatically move away from the electro-magnet when it is deënergized. As long as the block is clear or unoccupied by an engine or the like, it is obvious that the track circuit is closed and the electro-magnet 15 will be energized. In this closed circuit, current flows from one side of the source of current 12, through wire 12′, rail 2, wire 17, electro-magnet 15, wire 16, rail 1, wire 13, and back to the opposite pole of the source of current 12. When an engine travels into the entrance end of the block, the above referred to circuit is made through the engine and the electro-magnet 15 is cut out of circuit and deënergized.

The numeral 19 designates a source of current having one pole connected with a wire 19′ which is connected with the rail 1 and its opposite pole electrically connected with the armature 18, as shown.

The numeral 20 designates a stationary contact disposed near the armature 18 and adapted to be engaged by a contact 20′, carried by said armature, when the electro-magnet 15 is energized. The engagement between the contacts 20 and 20′ is broken when the electro-magnet 15 is deënergized. The stationary contact 20 has electrical connection with a pivoted metal contact segment 21, through the medium of a wire 22. The segment 21 coöperates with stationary contacts 23 and 24 and is provided at its curved edge intermediate the ends thereof, with an insulating block 25, as shown. The contact segment 21 swings in a vertical plane and is adapted to assume three positions, to wit, an upper to bring the insulating block 25 into engagement with the stationary contact 23 and the metal portion thereof in engagement with the stationary contact 24, an intermediate position to bring the metal portion of the contact into engagement with the stationary contact 23 and the insulating block 25 into engagement with the stationary contact 24, and a lowermost position to bring its metal portion in engagement with both stationary contacts 23 and 24. The contact segment 21 is moved synchronously with its signal and has operative connection therewith through the medium of a rigid rod 26, pivotally connected with the paddle and the segment, as shown.

Disposed near each of the contact segments 21 is a switch device comprising a horizontal rock-shaft 27, carrying rolls 28 and 29, provided respectively with metallic contact segments 30 and 31, as shown. The shaft 27 is turned in one direction by a gravity operated crank arm 32, having a suitable opening formed therethrough to receive the rod 26, such rod being provided at its lower end with a head 33. Rigidly connected with one end of the rock-shaft 27 is a disk 34, provided with a shoulder 35, adapted to be engaged by a pivoted holding pawl 36. This holding pawl is returned to and retained in its normal position by its horizontal arm 37. When this holding pawl is in its normal position, its vertical arm engages the shoulder 35 and thus prevents the turning of the rock-shaft 27 in one direction. The horizontal arm 37 of the holding pawl 36 is moved to release the rock-shaft 27 in order that the crank arm 32 may swing downwardly, as indicated by the arrow, by an electro-magnet 38 having one end of its winding connected with a wire 39, which is connected with a contact 40 adapted to engage the segment 31 when the rock-shaft 27 is in its normal position. The opposite end of the winding of the electro-magnet 38 is connected with a wire 41 having its opposite end connected with the stationary contact 23. The contact segment 31 is also engaged when in its normal position by a contact 42, connected with a wire 43, which is connected with the ramp section 6. Connected with the stationary contact 24 is a wire 44, which is connected with the ramp section 5.

Disposed near and inwardly of the entrance end of each block is an auxiliary ramp 45, which is curved longitudinally in a vertical plane. This auxiliary ramp is connected with a wire 46, which is connected with a contact 47, which always remains in electrical connection with the contact segment 30.

The numeral 48 designates a co-acting contact which engages the contact segment 30 only when the rock-shaft 27 is turned upwardly upon the semaphore blade being moved to its uppermost or danger position. The contact 48 is connected with a wire 49, connected with one pole of a source of current 50, having its opposite pole connected with the track rail 1 through the medium of a wire 51. If the train is traveling quite fast and the semaphore paddle should be slowly swung toward its upper or danger position, the train might reach the auxiliary ramp 45 before the paddle had time to complete its movement. The train would then be improperly stopped by the time the paddle has reached the danger or stop position. To overcome this difficulty I propose in a slightly modified form of the invention to adjustably mount the roll 28 upon the rock-shaft 27, so that the roll may be unlocked therefrom and turned with relation to, and subsequently locked to the rock-shaft 27. By thus turning the roll 28 with relation to the rock-shaft 27, one end of the segment 30 may be brought sufficiently near the contact 48, so that it will engage said contact 48 when the semaphore paddle has swung upwardly to its intermediate position and before it reaches its uppermost position.

In Fig. 1$^a$ I have shown the auxiliary ramp 45 connected with the source of current 50 through means which are operated by the relay 14. In this figure the reference character 45$^a$ designates a contact which is rigidly connected with and insulated from the armature 18, as shown. The wire 49 is connected with the contact 45$^a$. The numeral 46$^a$ designates a stationary contact which is engaged by contact 45$^a$, only when the relay is deënergized. The wire 46 is connected with stationary contact 46$^a$. When the train enters the block, the electro-magnet 15 is deënergized and the armature 18 will move away from said electro-magnet. Should the armature 18 stick and not open, the auxiliary ramp 45 will have no electrical connection with the source of current, whereby the train will be stopped by the same.

Attention is now called more particularly to Figs. 3 to 8, inclusive. In Fig. 3, I have shown a casing or box 53, provided with a removable outer side or door 54. This casing is adapted to be rigidly attached to the locomotive in any suitable manner. Within this casing is disposed the mechanically operated and electrically controlled apparatus to be described.

Rigidly connected with the lower portion of the locomotive is a bracket 55 to which is pivotally connected through the medium of a bolt 56, the forward end of a vertically swinging arm 57. At its lower end the securing arm 57 has a depending end portion 61, disposed at substantially right angles to the horizontal portion of such securing arm.

The numeral 62 designates a shoe, provided between the ends with a recess for receiving a hard steel block 63, having electrical connection with the shoe and held in place by any suitable means. The shoe 62 is provided with an upwardly extending shank 64, which is grooved for receiving the depending end portion 61, as shown. Insulating material is disposed between the shank 64 and the depending end portion 61 and insulated bolts 65 serve to hold these elements together. It is thus seen that the shoe 62 is securely attached to the swinging arm 51 and is thoroughly insulated therefrom. As shown in Fig. 3, a wire 66 is electrically connected with the shoe 62 and extends upwardly for electrical connection with the mechanically operated and electrically controlled apparatus disposed in the casing or box 53.

A push rod 67 has its lower end forked and straddling the rear end of the securing arm 57 and pivotally connected therewith, as shown at 68. Rigidly connected with the body portion of the engine, by any suitable means, is a vertical bracket 69, having horizontal portions 70 and 71. An adjusting sleeve 72 has screw-threaded engagement within an opening formed in the lower horizontal end portions 71 and receives therethrough the reciprocatory push rod 67. An upper push rod 73 has connection with the apparatus in the casing 53. The upper push rod 73 is provided between its ends with a stop 74 rigidly mounted thereon, such push rod reciprocating through an opening 75 formed in the upper horizontal end portion 70 of the bracket 69. The function of the stop 74 is to provide positive means to prevent any further upward movement of the rod which would be greater than the distance between said stop and the casing 53. A connecting sleeve 76 which is disposed within the bracket 69 has rigid connection with the lower end of the push rod 73, by means of a pin 77 and also slidably receives the upper end of the push rod 67. At its upper end the push rod 67 carries a pin 78, operating in an elongated slot 79 formed through the lower portion of the connecting sleeve 76. A compressible coil spring 80 of suitable stiffness is disposed in the connecting sleeve 76 and is interposed between the push rods 67 and 73, as shown. This connecting sleeve normally engages the adjusting sleeve 72 and it is thus seen that by turning such adjusting sleeve 72 the push rod 67 and shoe 62 may be permanently vertically adjusted.

I will now proceed to describe the mechanically operated and electrically controlled apparatus disposed within the casing 53. Rigidly conected with the upper end of the push rod 73 is a socket 82 (see Fig. 7) carrying an apertured extension 83, disposed within the lower forked end of a pivoted arm or element 84. This lower forked end of the arm 84 is provided with openings to receive a horizontal shaft 85, which also passes through the opening in the extension 83. The longitudinal movement of the shaft 85 in one direction is limited by an element 86 attached thereto by means of a screw 87 or the like. The shaft 85 extends through a central opening in a vertically movable carriage 88, which travels within an upstanding track or guide 89, which is rigidly connected with the bottom wall of the casing 53 by any suitable means. A pivoted arm or element 90 is disposed upon the outer portion of the shaft 85 and is engaged by a ring 91 held against longitudinal displacement by a transverse pin 92 or the like. It is thus seen that the ring 91 and associated elements also serve to prevent the longitudinal displacement of the shaft 85 in one direction. The pivoted arm or element 84 is provided with an inverted L-shaped opening 93, having a horizontal shoulder 94. Disposed within the L-shaped opening 93 is a horizontal bolt 95, which is connected with a depending link 96. The bolt 95 carries a grooved head 97, which operates within the track or guide 89, as shown. The depending link 96 has pivotal connection at its lower end with a crank 98, by means of a bolt 99 or the like. The crank 98 is rigidly mounted upon one end of a horizontal rock-shaft 100, extending through fixed bearings 101. Rigidly connected with the opposite end of the rock-shaft 100 is an upstanding crank 102, which is connected with the train stopping means.

The electrically operated means for controlling the mechanically operated elements of the apparatus, comprise an upstanding stationary electro-magnet 103 having a horse-shoe magnet core 104 formed of laminated sheets of iron. The electro-magnet 103 is adapted to be used with either direct or alternating currents. The electro-magnet 103 is rigidly mounted upon a horizontal fixed support or frame 103'. Disposed near and below the electro-magnet is a swinging lever-armature 105, which is rigidly connected at its outer end with a horizontal rock-shaft 106. This rock-shaft has an upstanding crank 107, rigidly connected with one end thereof. The rock-shaft 106 is journaled through the horizontal support or frame 103'. The upstanding crank 107 is provided through its upper portion with an elongated slot or opening 108, for receiving a transverse pin 109, which is carried by a lateral extension 110 formed upon the upper portion of the arm 84, as shown. It is thus seen that when the electro-magnet 103 is energized, the free end of the lever-armature 105 will be swung upwardly, the rock shaft 106 turned to swing the upstanding crank 107 to the right, whereby the arm 84 is also swung to the right so that the bolt 95 will clear the shoulder 94 and operate in the longitudinal portion of the L-shaped slot 93. When the arm 84 is elevated through the medium of the mechanically operated elements, it will not raise the link 96.

Rigidly mounted within the casing 53 is an upstanding support 111 provided near its upper end with a lateral extension 112, upon which is pivotally mounted a vertically swinging lever 114, by means of a screw 115 or the like. The upward movement of the lever 114 is limited by a stop 116 formed upon the support 11. A spring 117 is secured upon the support 11 and engages the swinging lever 114 to urge the same upwardly into engagement with the stop 116. At its free end, the lever 114 is provided with an opening 118 so that it may have suitable connection with a cord or wire 119 (see Fig. 4) which operates a valve, which in turn actuates a whistle, disposed in the cab, not shown. It is thus seen that when the lever 114 has its free end swung downwardly, the valve will be operated and the whistle sounded. Instead of employing an audible signal device, I may use a visible signal and it is to be understood that the term "signaling means" which is employed in the claims, is expressly intended to cover either an audible or visible signal device. The swinging lever 114 has a laterally extending pin 122 rigidly connected therewith between the ends thereof, as shown. This pin 122 is adapted to engage within a recess or notch 123 formed in the swinging arm 90, when the arm is sufficiently elevated to allow the pin 122 to enter said notch. The arm 90 is swung to the right by a weight 124 which is rigidly connected with the arm 90 by a crank 125. Rigidly connected with the arm 90 opposite the crank 125 is a short arm 126, provided with a lateral extension 127, which is engaged by a vertically swinging finger 128. This finger is supported by a horizontal sleeve 129, which is free to turn upon a horizontal shaft 130, which is connected with the support 103'. The sleeve 129 has a downwardly extending finger 131 rigidly connected with its opposite end, which finger is disposed to be engaged by the lever-armature 105. When the carriage 88 is elevated, through the medium of the mechanically operated elements and assuming that the electro-magnet 103 is deënergized, the swinging arm 90 is also elevated so that the pin 122 will enter the opening or notch 123. When the carriage 88 descends, the arm 90 will swing the lever 114 downwardly to operate the signaling means. When the lever 90 has traveled downwardly a certain distance in engagement with the pin 122, said lever will automatically release the pin when the arm 125 engages a fixed trip 132. If the electro-magnet 103 were energized during this operation, the free end of the lever-armature 105 is swung upwardly, finger 131 swung upwardly, finger 128 swung to the left, and arm 90 swung to the left to occupy its inoperative position. It is thus seen that the pin 122 could not enter the opening or notch 123, whereby the lever 114 will not be swung downwardly when the carriage 88 descends.

The wire 66 (see Fig. 3) is connected with one end of the winding of the electro-magnet 103, and the other end of such winding is connected or grounded with the framework of the engine.

The crank 102 is suitably connected with train stopping means, including means for cutting off the steam or applying the brakes or both.

The operation of the system is as follows:—Assuming that all of the blocks are clear, the semaphore paddles will be disposed in their lowermost positions. The train passing into block C from block D moves into proximity to the ramp 4, whereby the shoe 62 will engage the extension 8 of the ramp section 6. This extension 8 moves the mechanically operated elements of the apparatus slightly but not sufficiently to actuate the train stopping means. The shoe 62 next moves into engagement with the ramp section 6, which is in electrical connection with the source of current 19. As soon as this takes place a circuit is closed for energizing the electro-magnet 103, whereby the pivoted arm 84 is swung to the right so that such arm will not move the link 96 when the rod is elevated. The engine is thus allowed to pass the ramp 4 without being stopped. When the above referred to circuit is closed for energizing the electro-magnet 103, current flows from one pole of the source of current 19, through armature 18, wire 22, contact segment 21, wire 41, electro-magnet 38, contact 40, contact segment 31, contact 42, wire 43, ramp section 6, shoe 62, wire 66, electro-magnet 103, the frame-work of the engine, rail 1, wire 19', and back to the opposite pole of the source of current 19. When this circuit is closed the electro-magnet 38 is energized, whereby the holding pawl 36 is moved to release the disk 34, which is rigidly mounted upon the rock-shaft 27. The gravity operated crank 32 now drops to its lowermost position, turning the rock-shaft 27 in the same direction, whereby contact 42 is disconnected from contact segment 31 and the above referred to circuit is opened and ramp section 6 disconnected from the source of current 19. The shoe 62 and associated elements are further elevated but do not now move the link 96, since the arm 84 has been previously swung to its inoperative position. The shoe 62 now travels into engagement with the ramp section 5, whereby a circuit is closed for energizing the electro-magnet 103. In this circuit, current flows from one pole of the source of current 19 through armature 18, wire 22, segment 21, contact 24, wire 44, ramp section 5, shoe 62, wire 66, electro-magnet 103, the frame-work of the engine, rail 1, wire 19', and back to the opposite pole of the source of current. When the shoe 62 and associated elements begin to descend as they approach the outer end of the ramp section 5, the carriage 88 also descends, pulling the pivoted arm 90 downwardly, and the electro-magnet 103 being energized the arm 90 is swung to the left, whereby the pin 122 will not enter the recess 123 and the lever 114 will remain in its elevated position. It is thus seen that the engine is allowed to pass both ramp sections 5 and 6 upon entering the clear block C without the train stopping and signaling means being actuated. As the engine moves into proximity to each ramp, the same operation takes place, provided all of the blocks are clear. When the engine has entered the block C, the paddle 12$^c$ is swung to its uppermost or danger position, whereby rock-shaft 27 is first turned to its normal position and then upwardly past such normal position. The paddle 12$^c$ remains in this uppermost position until the engine has traveled into the block B, when the paddle 12$^c$ will be moved to its intermediate position to indicate caution. When the engine has traveled into block A, where it is now located, the paddle 12$^c$ will be moved to its lowermost position. The engine being in block A, the paddle 12$^a$ is in its uppermost position, the paddle 12$^b$ is in its intermediate position, and the paddle 12$^c$ is in its lowermost position. Assuming that a second engine has passed the ramp 4 at the entrance end of block C and moves into proximity to the ramp 4, at the entrance end of block B, the shoe 62 is moved into engagement with the extension 8 of the ramp section 6, whereby the mechanically operated elements of the apparatus are slightly moved, subsequently to which the shoe engages ramp section 6, whereby a circuit is closed for energizing the electro-magnet 103 which prevents further operation of the mechanically operated elements by the shoe being elevated. In this closed circuit, current flows from one side of the source of current 19, through armature 18, wire 22, segment 21, wire 41, electro-magnet 38, wire 39, contact 40, contact segment 31, contact 42, wire 43, ramp section 6, shoe 62, wire 66, electro-magnet 103, the frame-work of the engine, rail 1, wire 19', and back to the opposite pole of the source of current 19. The shoe 62 now travels into engagement with the ramp section 5, the circuit being broken when the shoe engages the insulation 7, whereby electro-magnet 103 is deënergized. The ramp section 5 is disconnected from the source of current 19 since contact 24 is in engagement with the insulation 25. The arm 90 being in its elevated position, as shown in Fig. 4, and the electro-magnet 103 being deënergized, the pin 122 will enter the recess 123. When the arm 90 descends, which occurs when the shoe 62 approaches the outer end of the ramp section 5, the lever 114 will be swung downwardly, whereby cable 119 will be pulled to actuate the valve, which causes the whistle to be sounded. It is thus seen that as the engine passes the ramp at the entrance end of the block B, the train stopping means are not actuated but the whistle is sounded to inform the engineer that the block A is occupied. When the engine approaches the entrance end of block A, the shoe 62 engages the extension 8 and then the ramp-section 6. This ramp section 6 is disconnected from the source of current 19, at the contact 40 and segment 31, contact 23 and insulation 25 and contacts 20 and 20′. The electro-magnet 103 being deënergized, the shoe 62 will be elevated which causes the rod 73 to be elevated, whereby the arm 84 will raise the link 96. This link turns the rock-shaft 100, which causes the train stopping means to be actuated. It is thus seen that the engine will be stopped by the ramp 4 before it enters the block A.

When the block A is occupied by a train, paddle 12ª should be swung to its uppermost or danger position, as shown. If this has been done, the engine will be allowed to pass the ramp 45, which is placed a considerable distance from the entrance end of the block. Assuming that the engine in the block A is approaching the ramp 45, the shoe 62 will engage the ramp 45, whereby a circuit will be closed for energizing the electro-magnet 103 so that the arm 84 will be swung to its inoperative position. In this circuit current flows from one pole of the source of current 50, through wire 49, contact 48, contact segment 30, contact 47, wire 46, ramp 45, wire 66, electro-magnet 103, the frame-work of the engine, rail 1, wire 51, and back to the opposite pole of the source of current. It is thus seen that when the paddle 12ª is properly swung to its danger position upon the entrance of the train into block A, the ramp 45 will be connected with the source of current 50, whereby such engine is allowed to pass the ramp 45 without actuating the train stopping means. If, however, the paddle 12ª should not be properly operated upon the entrance of the engine into the block, contact 48 would disengage contact segment 30, whereby the ramp 45 would have no connection with the source of current 50 and hence the train stopping means would be actuated when the shoe 62 travels into engagement with the ramp 45. By this means the engineer can tell whether the paddle has been properly operated to protect the rear of the engine upon entering a block.

Particular attention is called to the fact that the apparatus carried by the engine, automatically disconnects the ramp section 6 from the source of current upon the engine entering the block. This protects the rear of the engine while the same is entering the block. As soon as the engine enters the block, electro-magnet 15 is cut out of the track circuit, whereby the contacts 20 and 20′ are disconnected and the ramp section 6 is further disconnected from the source of current 19 at this point. If the paddle 12ª should be improperly set to indicate a clear track when in fact, the block is occupied, it is obvious that the engine will be stopped by the ramp-section 6, which is now disconnected from the source of current 19. When the paddle 12ª is properly swung to its danger position, the ramp section 6 is disconnected from the source of current 19 at a third point by contact 23 and the insulation 25.

It is to be understood that the form of my invention herewith shown and described, is to be taken as a preferred example of the same, and that certain changes in the shape, size, and arrangement of parts may be resorted to without departing from the spirit of the invention or the scope of the subjoined claims.

Having thus described my invention, I claim:—

1. In a train control system of the character described, a track, ramps disposed near the track at suitably spaced intervals, a source of current having one pole thereof connected with the track rail and its opposite pole connected with a ramp, mechanically operated and electrically controlled apparatus secured upon a vehicle traveling on the track, and means for disconnecting said ramp from the source of current when the ramp is engaged by a portion of said apparatus.

2. In a train control system of the character described, a track divided into blocks, a ramp disposed suitably near the entrance end of each block, a source of current having one pole thereof connected with the ramp, mechanically operated and electrically controlled apparatus carried by a vehicle traveling on the track, and electrical means energized when a portion of said apparatus engages the ramp, to disconnect said ramp from said source of current.

3. In a train control system of the character described, a track divided by insulating means into blocks, a ramp disposed suitably near the entrance end of each block, a source of current having one pole thereof connected with the track rail and its opposite pole with the ramp, a relay for controlling the electrical connection between the ramp and the source of current, a track circuit including a source of current connected with the relay, mechanically operated and electrically controlled apparatus carried by a vehicle traveling upon the track, and means energized upon the engagement of a part of said apparatus with the ramp, to disconnect said ramp from the source of current.

4. In a train control system of the character described, a track divided into blocks, a ramp disposed suitably near the entrance end of each block, a source of current having one pole thereof connected with the track rail, a switch device, electrical connections between the opposite pole of the source of current and the switch device including a wire and electro-magnet connected therewith, means operated by the electromagnet to control the operation of the switch device, a wire electrically connecting the switch device and ramp, and mechanically operated and electrically controlled apparatus carried by a vehicle to travel into engagement with the ramp.

5. In a train control system of the character described, a track divided into blocks, a ramp disposed suitably near the entrance end of each block, a source of current having one pole thereof connected with the track rail, a switch device, electrical connections between the opposite pole of the source of current and the switch device including electrically operated means to control the operation of said switch device, and electrical connections between the switch device and the ramp.

6. In a train control system of the character described, a track divided into blocks, a ramp disposed suitably near the entrance end of each block, a source of current having one pole therof connected with the track rail, a rock-shaft, means to automatically turn the same in one direction when released, means to normally hold the rock-shaft against movement, an electrical device for operating the holding means, a switch device operated by the rock-shaft, means electrically connecting the switch device and electrical device with the opposite pole of the source of current, and electrical connections between the switch device and the ramp.

7. In a train control system of the character described, a track divided into blocks, ramp sections disposed suitably near the entrance end of each block, a source of current having one pole thereof connected with the track rail and its opposite pole normally connected with the ramp sections, mechanically operated and electrically controlled apparatus adapted to be carried by a vehicle traveling on the track, and means to disconnect one ramp section from the source of current, when a portion of said apparatus engages such ramp section.

8. In a train control system of the character described, a track divided by insulating means into blocks, ramp sections disposed suitably near the entrance end of each block, a source of current having one pole thereof connected with the track rail and its opposite pole normally electrically connected with the ramp sections, mechanically operated and electrically controlled apparatus adapted to be carried by a vehicle traveling on the track, means to break the electrical connection between one ramp section and the source of current, when a portion of the apparatus engages such ramp section, and additional means including a track circuit to break the electrical connection between the ramp sections when the block is occupied by a vehicle.

9. In a train control system, a track divided by insulating means into blocks of suitable length; a ramp disposed suitably in advance of the entrance end of each block; a circuit connecting each block with the adjacent ramp guarding the entrance end of the block in advance thereof; a relay track circuit connected with each block and controlling the operation of the ramp circuit of the block in rear thereof; an indicating ramp arranged adjacent each block between the ends thereof and spaced a substantial distance from the entrance end of each block; a circuit connected with one rail of each block and with the corresponding indicating ramp; and means to close the indicating ramp circuit only when the first named ramp circuit is opened.

10. In a train control system, a track divided by insulating means into blocks of suitable length; a ramp disposed suitably in advance of the entrance end of each block; a circuit connected with one rail of each block and with the adjacent ramp guarding the entrance end of the block in advance thereof; a relay circuit connected with each block and controlling the operation of the ramp circuit of the block in rear thereof; an indicating ramp arranged inwardly of and between the ends of each block; a circuit connected with the indicating ramp and with one rail of the corresponding block; and switch means to simultaneously open the first named ramp circuit and close the indicating ramp circuit.

11. In a train control system of the character described, a track divided by insulating means into blocks; a protecting ramp disposed suitably near the entrance end of each block; a source of current having one pole thereof connected with the ramp; mechanically operated and electrically controlled apparatus carried by a vehicle traveling on the track to engage the ramp and be moved thereby; electrically operated means energized when a portion of said apparatus engages the ramp to disconnect the ramp from the source of current; an indicating ramp arranged in advance of and spaced a substantial distance from the ramp which guards the entrance end of each block; a source of current; and means connecting and disconnecting the last named source of current with and from the indicating ramp and connecting the same when the protecting ramp is disconnected from its source of current.

In testimony whereof I affix my signature in presence of two witnesses.

WILLIAM B. MURRAY.

Witnesses:
JAMES L. CRAWFORD,
B. V. FISHBURNE.